(12) United States Patent
Hirose

(10) Patent No.: US 8,885,218 B2
(45) Date of Patent: Nov. 11, 2014

(54) IMAGE PROCESSING APPARATUS, IMAGE PROCESSING METHOD, STORAGE MEDIUM

(71) Applicant: Canon Kabushiki Kaisha, Tokyo (JP)

(72) Inventor: Fumiaki Hirose, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/915,062

(22) Filed: Jun. 11, 2013

(65) Prior Publication Data

US 2013/0335759 A1 Dec. 19, 2013

(30) Foreign Application Priority Data

Jun. 14, 2012 (JP) ................................. 2012-134842

(51) Int. Cl.

| | |
|---|---|
| *G06K 1/00* | (2006.01) |
| *G06K 15/02* | (2006.01) |
| *G06K 15/12* | (2006.01) |
| *G03G 15/00* | (2006.01) |
| *B41J 29/393* | (2006.01) |
| *H04N 1/60* | (2006.01) |

(52) U.S. Cl.
CPC .......... *G06K 15/1219* (2013.01); *G06K 15/027* (2013.01); *G03G 15/5062* (2013.01); *B41J 29/393* (2013.01); *G06K 15/129* (2013.01)
USPC .......... 358/1.9; 358/1.18; 358/505; 358/1.14; 358/474; 358/494; 382/275; 347/12

(58) Field of Classification Search
None
See application file for complete search history.

(56) References Cited

U.S. PATENT DOCUMENTS

| | | | |
|---|---|---|---|
| 7,430,065 B2 * | 9/2008 | Arakai et al. ................ | 358/3.26 |
| 2008/0117279 A1 * | 5/2008 | Koga et al. .................... | 347/248 |
| 2009/0231606 A1 * | 9/2009 | Kawai et al. .................. | 358/1.9 |

FOREIGN PATENT DOCUMENTS

JP 2004-170755 A 6/2004

* cited by examiner

*Primary Examiner* — Quang N Vo
(74) *Attorney, Agent, or Firm* — Canon U.S.A., Inc. IP Division

(57) ABSTRACT

An image processing apparatus configured to transmit image data to a printing unit for printing an image on a sheet, includes a first obtaining unit configured to obtain information representing displacement of an image in a sub-scanning direction, a second obtaining unit configured to obtain information representing displacement of an image to be printed on a sheet in a sub-scanning direction with respect to the sheet, a correction unit configured to, based on a plurality of correction amounts determined from information obtained by the first obtaining unit and information obtained by the second obtaining unit, at each of a plurality of positions in a main-scanning direction, perform correction for shifting the image data in the sub-scanning direction, and a transmission unit configured to transmit the corrected image data to the printing unit.

15 Claims, 13 Drawing Sheets

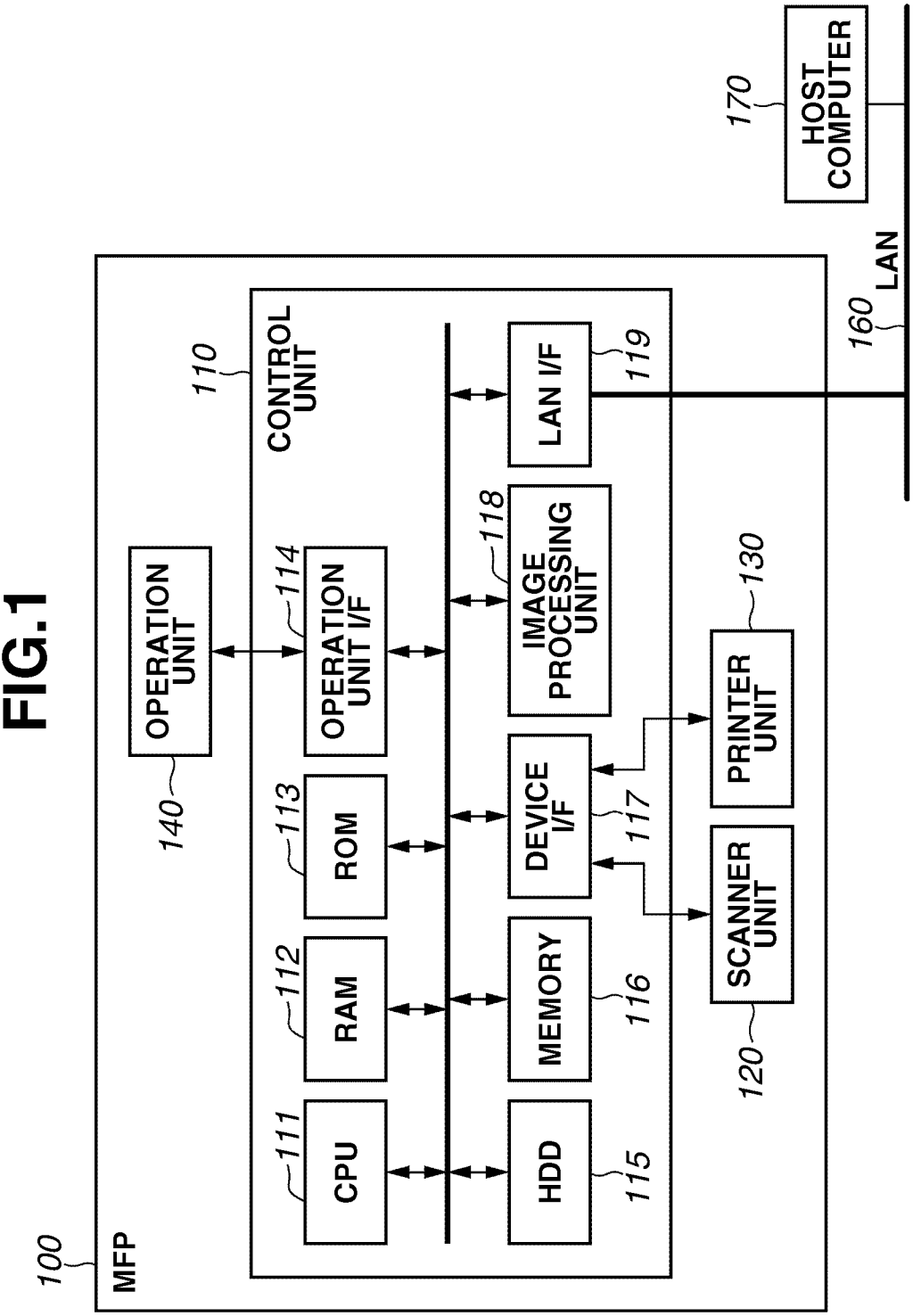

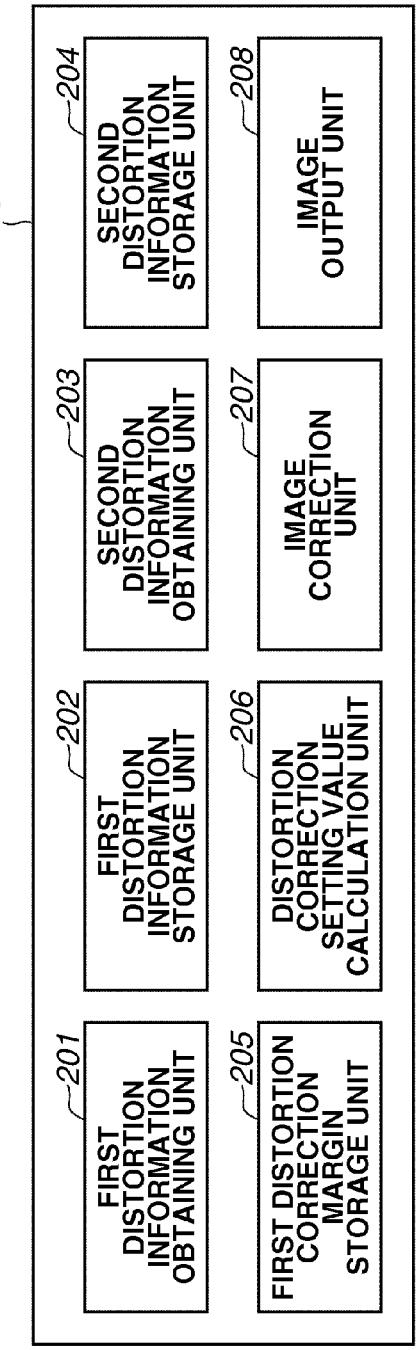
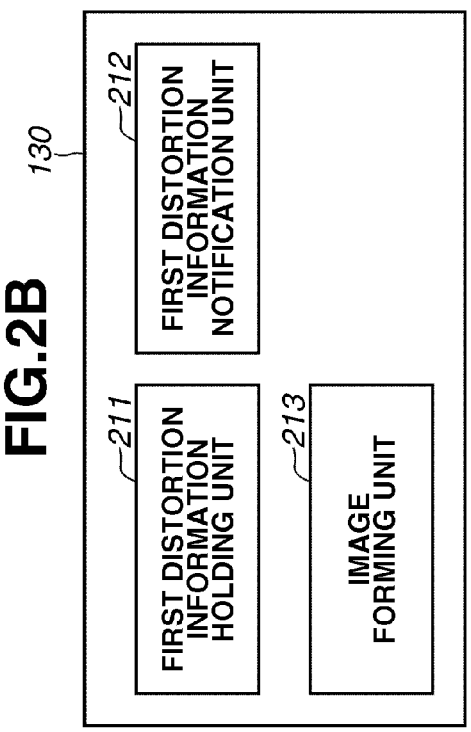

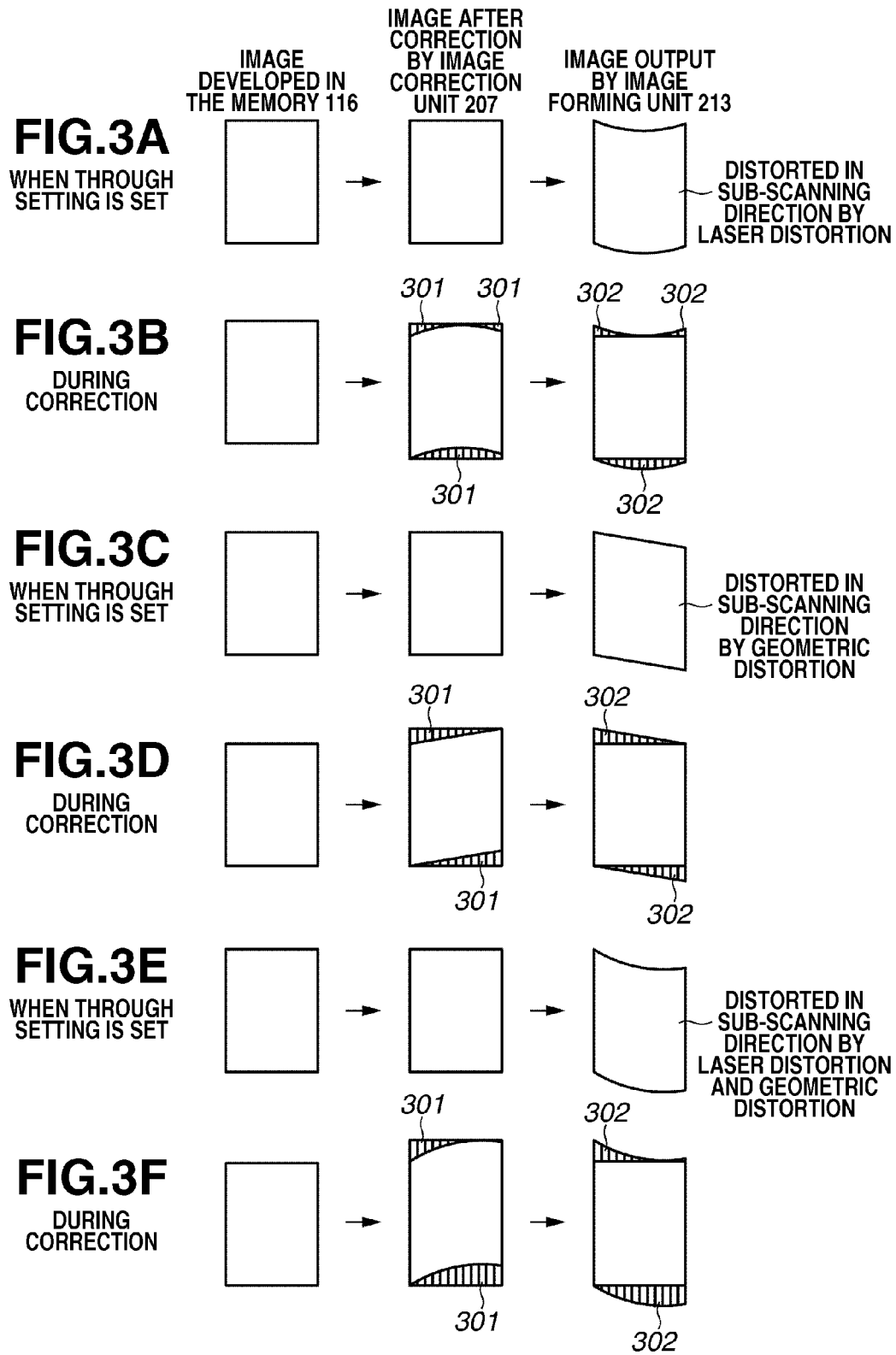

FIG.4A
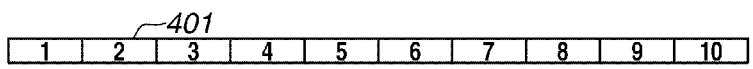
FIG.4B  START ADDRESS: 0x10000000  SCANNING DIRECTION: +
FIG.4C 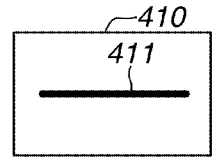  FIG.4D 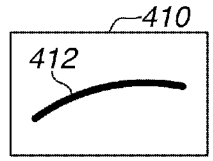
START ADDRESS: 0x10000000  SCANNING DIRECTION: +
CHANGE POINT: 2, 4
FIG.4E
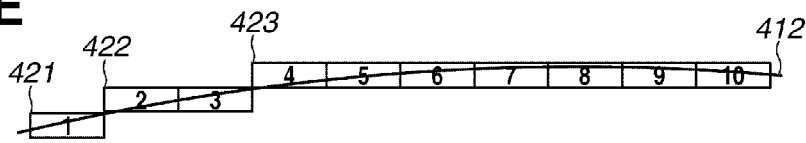
FIG.4F
FIG.4G
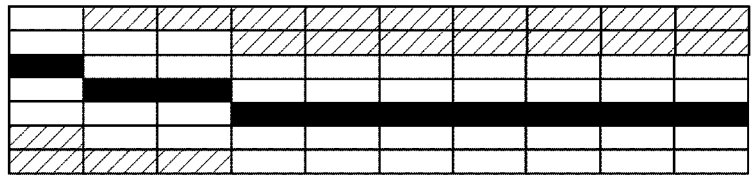
FIG.4H
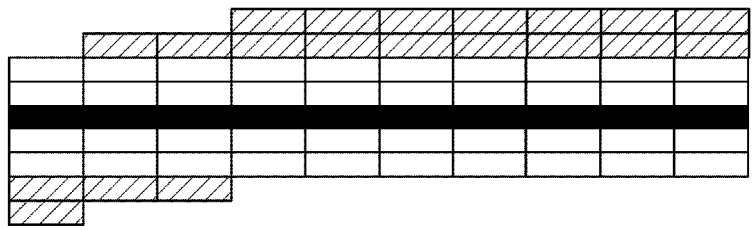

FIG.7A
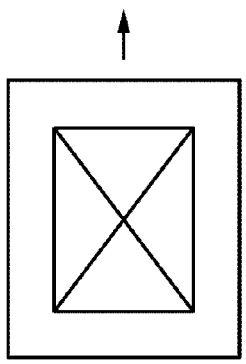
FIG.7B
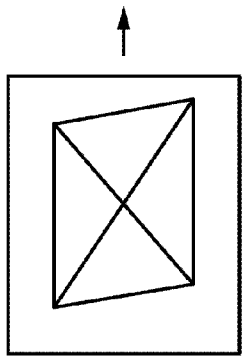
FIG.7C
GEOMETRIC CORRECTION PATTERN WILL BE OUTPUT.
SELECT CASSETTE THAT A3 PAPER IS IN AND PRESS
PATTERN OUTPUT BUTTON.
| CST1 | CST4 |
| CST2 | CST5 |
| CST3 | CST6 |
| CANCEL | OUTPUT PATTERN |
FIG.7D
MEASURE AND INPUT LENGTH OF
BELOW m0, m1, AND m2.
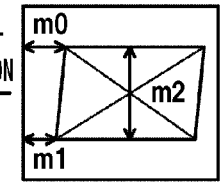
m0 [ 2.0 ] mm ▲ ▼
m1 [ 2.0 ] mm ▲ ▼
m2 [ 293.0 ] mm ▲ ▼
| CANCEL | OK |

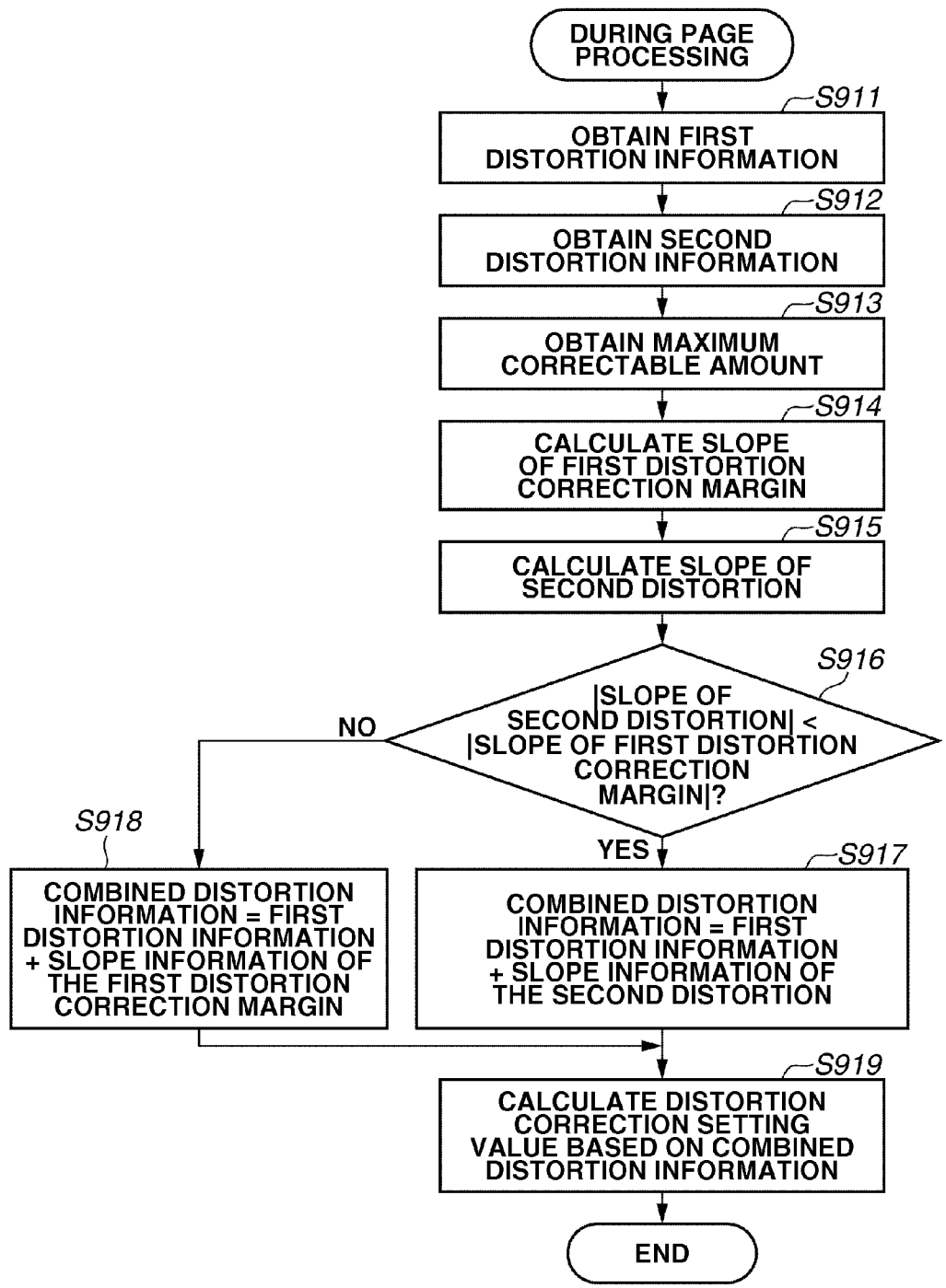

IMAGE PROCESSING APPARATUS, IMAGE PROCESSING METHOD, STORAGE MEDIUM

BACKGROUND OF THE INVENTION

1. Field of the Invention

The present invention relates to image processing technology for processing image data.

2. Description of the Related Art

Image distortion can occur due to bending of the laser scanning line (laser distortion) caused by plane tilt of a polygon mirror that deflects the laser in an image forming apparatus such as a laser printer. Japanese Patent Application Laid-Open No. 2004-170755 discusses a distortion correction technology that corrects image distortion caused by laser distortion by shifting in the sub-scanning direction a pixel position of the image data at a position in the main-scanning direction according to the laser distortion. In Japanese Patent Application Laid-Open No. 2004-170755, laser distortion information representing a level of laser distortion in the sub-scanning direction is obtained at each position in the main-scanning direction by measuring a registration patch formed on a transfer belt with a detection sensor. Based on the laser distortion information, image data is formed so as to cancel out that laser distortion. When an image is output using this modified image data, the image distortion has been apparently corrected.

Japanese Patent Application Laid-Open No. 2004-170755 discusses a method for performing distortion correction based on laser distortion information obtained based on a measurement result by a detection sensor that detects a registration patch. Namely, Japanese Patent Application Laid-Open No. 2004-170755 discusses a detection sensor based distortion correction, which corrects laser distortion determined with the detection sensor.

However, Japanese Patent Application Laid-Open No. 2004-170755 does not discuss a distortion correction method that includes image distortion due to skew (geometric distortion) of the sheet on which the image is to be printed or skew caused by assembly error of the transfer belt that conveys the sheet, for example. Specifically, as illustrated in FIG. 11A, when the transfer belt and the sheet are skewed, for example, an image of a distortion-corrected straight line that is to be printed on a sheet is a straight line that is free from bending with respect to the detection sensor, in which bending due to laser distortion has been corrected. However, since the skew of the transfer belt and the sheet are not considered, the ultimately obtained image suffers from skew distortion with respect to the sheet.

Further, an image forming apparatus has been developed that uses two transfer belts, a primary transfer belt and a secondary transfer belt, in which laser distortion information is obtained by detecting with a detection sensor a registration patch formed on the primary transfer belt. This image forming apparatus is configured so that an image formed on the primary transfer belt is transferred onto the sheet that is conveyed by the secondary transfer belt. In this image forming apparatus, since a patch formed on the primary transfer belt is detected, the obtained laser distortion information does not consider a positional relationship, such as twisting of a position where the primary transfer belt and the secondary transfer belt are facing each other. Accordingly, the image that is printed on the sheet still suffers from skew distortion with respect to the sheet.

SUMMARY OF THE INVENTION

The present invention is directed to restraining an image from being distorted with respect to a sheet by correcting image distortion due to geometric distortion caused by assembly error of the transfer belt, for example, and laser distortion. In the following, unless otherwise stated, distortion correction refers to correction of distortion in the sub-scanning direction in which consideration is given to both laser distortion and geometric distortion. Further, a distorted image refers to an image having laser distortion, or geometric distortion, or both of these, in the sub-scanning direction.

According to an aspect of the present invention, an image processing apparatus configured to transmit image data to a printing unit for printing an image on a sheet, includes a first obtaining unit configured to obtain information representing displacement of an image in a sub-scanning direction, a second obtaining unit configured to obtain information representing displacement of an image to be printed on a sheet in a sub-scanning direction with respect to the sheet, a correction unit configured to, based on a plurality of correction amounts determined from information obtained by the first obtaining unit and information obtained by the second obtaining unit, at each of a plurality of positions in a main-scanning direction, perform correction for shifting the image data in the sub-scanning direction, and a transmission unit configured to transmit the corrected image data to the printing unit.

Further features and aspects of the present invention will become apparent from the following detailed description of exemplary embodiments with reference to the attached drawings.

BRIEF DESCRIPTION OF THE DRAWINGS

FIG. 1 is a system block diagram of a MFP 100 used as an image processing apparatus according to the present invention.

FIGS. 2A and 2B illustrate modules that perform image processing for distortion correction.

FIGS. 3A, 3B, 3C, 3D, 3E, and 3F illustrate a concept of the distortion correction processing performed by an image correction unit 207.

FIGS. 4A, 4B, 4C, 4D, 4E, 4F, 4G, and 4H illustrate image correction processing performed by the image correction unit 207.

FIGS. 7A, 7B, 7C, and 7D illustrate a procedure when setting second distortion information.

FIGS. 9A and 9B illustrate processing performed when performing distortion correction with a host computer 170.

DESCRIPTION OF THE EMBODIMENTS

Various exemplary embodiments, features, and aspects of the invention will be described in detail below with reference to the drawings.

Figure 10:
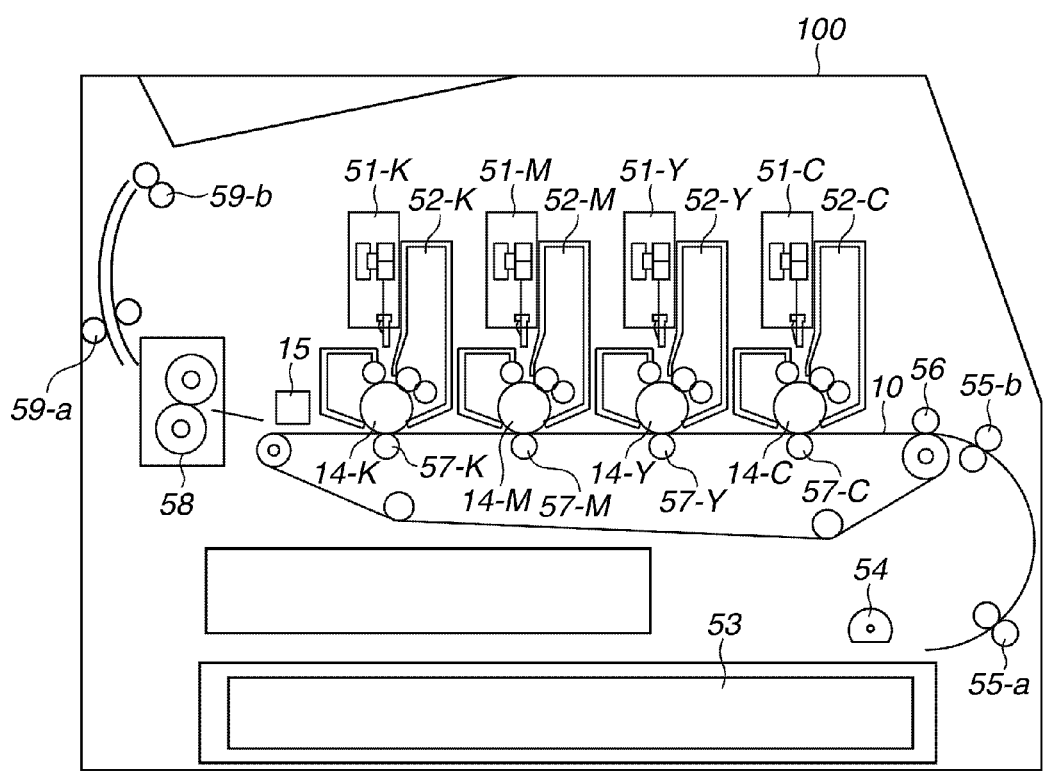
FIG. 10 illustrates an image processing apparatus according to a first exemplary embodiment.

A first exemplary embodiment will now be described.
Image Processing Apparatus Configuration FIGS. 10 and 1 are an internal configuration diagram and a system block diagram of a multifunction peripheral (MFP) 100 used as an image processing apparatus according to the present invention.

First, using FIG. 10, the internal configuration of the MFP 100 will be described.

The MFP 100 according to the present exemplary embodiment is a tandem type color image forming apparatus, in which an image forming unit for each process color is arrayed along a conveyance direction of a transfer belt 10. A transfer material cassette 53 is mounted in this color image forming apparatus at a lower portion on the right side of the apparatus.

A sheet-like recording medium set in the transfer material cassette 53 is pulled out one sheet at a time by a feeding roller 54, and guided to the transfer belt 10 by a pair of conveyance rollers 55-a and 55-b. The transfer belt 10 conveys the sheet to an image forming unit, and each image forming unit forms (prints) the respective process color on the sheet.

The image forming unit printing a cyan image, which is one of the process colors, on the sheet includes a photosensitive drum 14-C, an exposure unit 51-C, a developing unit 52-C, and a transfer unit 57-C. The image forming units for the other process colors (yellow, magenta, and black) are similarly configured.

The printing of an image on a sheet will now be described using the cyan image forming unit as an example. The exposure unit 51-C performs exposure scanning on the photosensitive drum 14-C with a laser according to image data, and forms a latent image. Then, the developing unit 52-C develops the latent image with a developer to form a developer image. The transfer unit 57-C transfers the developer image onto a sheet that has been conveyed by the transfer belt 10. By performing this image forming process with each of the image forming units, a color image is formed on the sheet. The image formed on the sheet is fixed by heating with a fixing unit 58, and is then discharged out of the MFP 100 as a print product by discharge rollers 59-a and 59-b.

Further, in a below-described calibration mode, a detection sensor 15 generates laser distortion information that represents laser scanning line distortion unique to each process color of the exposure unit 51 by detecting a registration detection pattern of each process color formed on the transfer belt 10.

This detection sensor 15 may also be configured to detect a registration detection pattern formed on the photosensitive drum 14.

In addition, the MFP 100 according to the present exemplary embodiment is configured so that the developer image is directly transferred from each image forming unit onto a sheet conveyed by the transfer belt 10. However, the present invention may also be applied in an MFP 100 that is configured so that an image in each color formed by the respective image forming units is overlaid and primarily transferred onto an intermediate transfer belt, and then the color images that have been superimposed on the intermediate transfer belt are secondarily transferred onto a sheet conveyed by the conveyance belt. When employing a secondary transfer configuration in which the MFP 100 includes an intermediate transfer belt, the detection sensor 15 may be configured so as to detect a registration detection pattern formed on the photosensitive drum 14 or the intermediate transfer belt.

Next, the system configuration of the MFP 100 will be described with reference to FIG. 1.

A control unit 110 is connected to a scanner unit 120, which is an image input device, and a printer unit 130 (refer to FIG. 2B), which is an image output device, and controls the input/output of image data. A central processing unit (CPU) 111 controls the overall operation of the MFP 100 by executing a program developed in a random-access memory (RAM) 112. The RAM 112 is also an image memory for temporarily storing image data. A read-only memory (ROM) 113 is a boot ROM, in which a system boot program is stored.

The control unit 110 generates a bitmap image of each process color by interpreting page description language (PDL) data received from a host computer 170, for example, and transmits the generated bitmap images to the printer unit 130.

An operation unit interface (I/F) 114 is an interface to connect an operation unit 140 and the control unit 110, and outputs to the operation unit 140 image data for display on the operation unit 140. Further, the operation unit I/F 114 transmits information input by the user from the operation unit 140 to the CPU 111.

A hard disk drive (HDD) 115 stores, for example, system software, image data, and programs for controlling operation of the MFP 100. The programs stored in the HDD 115 are computer programs executed by the CPU 111 for realizing the processing performed by the modules and flowchart illustrated in FIGS. 2A and 5. The programs stored in the HDD 115 are loaded into the RAM 112, and the CPU 111 executes the programs to control the operation of the MFP 100.

Similar to the HDD 115, a memory 116 stores image data and other data. A device I/F 117 connects the scanner 120 and the printer unit 130, which are image input/output devices, with the control unit 110, and performs synchronous/asynchronous conversion of the image data.

An image processing unit 118 (refer to FIG. 2A) performs image processing on image data read from a document by the display unit 120, and image data to be output to the printer unit 130. The image processing for correcting distortion according to the present invention is also performed by the image processing unit 118.

A local area network (LAN) I/F 119 is an interface connecting a LAN 160 and the control unit 110. The LAN I/F 119 controls the exchange of various types of information that is transmitted and received via the LAN 160.

The host computer 170, which is connected to the MFP 100 via the LAN 160, performs the transmission of PDL data to the MFP 100, for example.

The printer unit 130 is a printing unit included in the MFP 100 that functions as a printing means to perform printing based on the bitmap data generated by the control unit 110. The internal configuration of the printer unit 130 is as described with reference to FIG. 10. Operation of the printer unit 130 is controlled by the control unit 110. Broadly speaking, there are three operation modes of the printer unit 130. The first is a print mode for performing normal printing of an image on a sheet. The second is a calibration mode for obtaining laser distortion information that represents laser scanning line distortion of a printer engine in the printer unit 130, especially the exposure unit 51. The third is a setting mode for setting geometric distortion information that represents geometric distortion of an image with respect to a sheet, such as skew distortion of a transfer belt that cannot be corrected by distortion correction of an image that is performed based on laser distortion information.

The calibration mode will now be briefly described. Calibration mode is executed in a case where there is a possibility that the locus of the scanning line produced by the laser scanning performed by the exposure unit 51 may change. For example, calibration mode is executed when the operation state of the MFP 100 satisfies a predetermined operation condition. Specifically, calibration mode is executed each time a predetermined number of sheets is printed, or after the photosensitive drum 14 has been replaced.

In calibration mode, first, the exposure unit 51 forms a latent image of the registration detection pattern by performing exposure scanning on the photosensitive drum 14 with a laser. The developing unit 52 develops the registration detection pattern of each process color, and the transfer unit 57 transfers the registration detection pattern onto the transfer belt 10. A displacement amount from a position of the laser scanning line, which is an ideal straight line, is detected by the detection sensor 15 based on the registration detection pattern transmitted onto the transfer belt 10. Further, the displacement amount may also be detected by the detection sensor 15 detecting the registration detection pattern of each process color formed on the photosensitive drum 14. Laser distortion information for each process color is generated by analyzing the displacement amount, and this laser distortion information is stored for each process color by the printer unit 130 (first distortion information storage unit 211).

This laser distortion information may also be generated by analyzing the displacement amount of the registration detection pattern of each process color based on the registration detection pattern of a specific color (e.g., black) as the reference among the process colors.

Figure 11A:
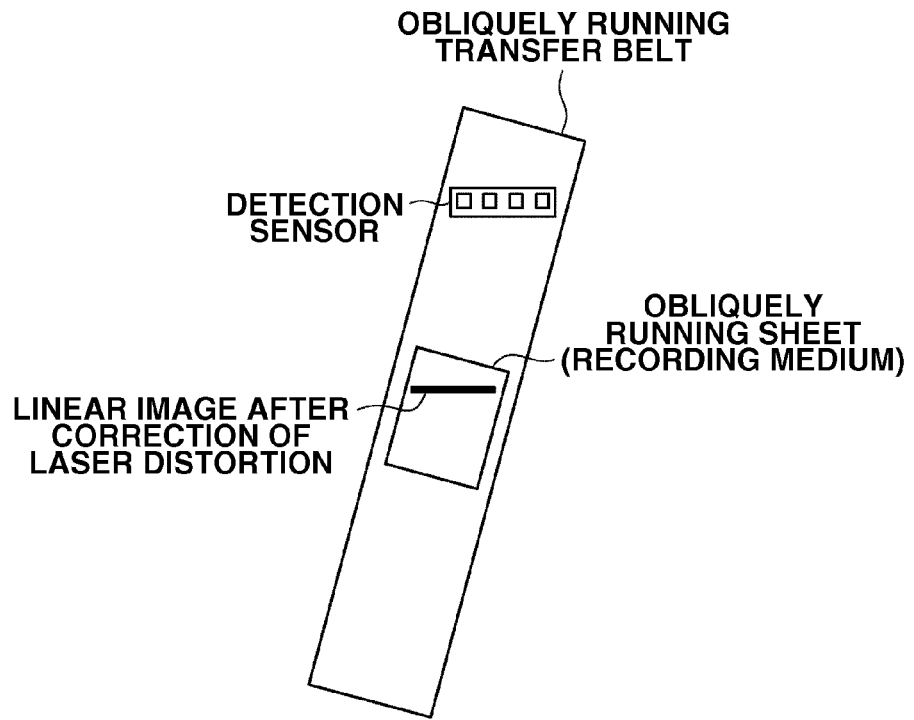
FIGS. 11A and 11B illustrate geometric distortion.

An image that has been corrected using the laser distortion information about each process color generated by calibration in the present exemplary embodiment is, as illustrated in FIG. 11A, an image that is free from any bending caused by laser distortion with respect to the detection sensor 15 for each process color.

Once the laser distortion information has been generated and stored in calibration mode, the mode proceeds to print mode, in which the actual printing is performed.

In print mode, the image processing unit 118 generates a bitmap image based on the print data transmitted from the host computer 170, and corrects the bitmap image based on the laser distortion information and geometric distortion information stored in the printer unit 130.

In present exemplary embodiment, before correcting bending caused by laser distortion and geometric distortion, the image processing unit 118 generates N-value image data (e.g., binary or 16-bit) by subjecting a multi-value (e.g., 256-bit) bitmap image to halftone processing. The data size of the bitmap image is thus decreased. The image processing unit 118 executes the distortion correction according to the present exemplary embodiment on the N-value bitmap image data.

The image processing unit 118 transmits the corrected bitmap image to the printer unit 130, and the printer unit 130 prints the corrected bitmap image. In the present exemplary embodiment, as described below, the image processing unit 118 subjects the bitmap image to distortion correction using not only laser distortion information, but geometric distortion information as well, and the printer unit 130 prints the distortion-corrected bitmap image.

Processing Modules for Distortion Correction

FIGS. 2A and 2B are diagrams that illustrate the modules that perform image processing for distortion correction according to the present invention. FIG. 2A schematically illustrates the respective processing units realized by the image processing unit 118.

A first distortion information obtaining unit 201 obtains laser distortion information stored by the printer unit 130 (first distortion information storage unit 211), and transmitted from the printer unit 130 (first distortion information notification unit 212) via the device I/F 117.

A first distortion information storage unit 202 stores the laser distortion information (first distortion information) obtained by the first distortion information obtaining unit 201.

A second distortion information obtaining unit 203 obtains geometric distortion information (second distortion information) stored in the HDD 115 or the RAM 112 that is input based on a user instruction from the operation unit 140 in the setting mode.

A second distortion information storage unit 204 stores the geometric distortion information obtained by the second distortion information obtaining unit 203.

A first distortion correction margin storage unit 205 stores information about distortion correction margin (hereinafter referred to as slope of first distortion correction margin) that is calculated from the laser distortion information. The first distortion correction margin and the slope of the first distortion correction margin will be described below with reference to FIG. 6B.

A distortion correction setting value calculation unit 206 performs calculation of a setting value (distortion correction setting value) for distortion correction based on the first distortion information and the second distortion information. Calculation of the distortion correction setting value will be described below with reference to FIG. 8.

An image correction unit 207 performs image distortion correction based on the distortion correction setting value calculated by the distortion correction setting value calculation unit 206. The specific process content performed by the image correction unit 207 will be described below with reference to FIG. 4.

An image output unit 208 outputs the image corrected by the image correction unit 207 to the printer unit 130 (image forming unit 213) via the device I/F 117.

FIG. 2B schematically illustrates the respective processing units that is realized by the printer unit 130.

The first distortion information storage unit 211 stores laser distortion information. The laser distortion information is information representing the displacement amount of a laser scanning line at each section arrayed in the main-scanning direction, which is generated based on the displacement amount of the registration detection pattern generated in the calibration mode. Specifically, the laser distortion information is a displacement amount (value of the Y coordinate) in the sub-scanning direction of the actual laser locus with respect to an ideal straight scanning line (X axis) at each section, obtained by dividing a main-scanning direction maximum output range of the printer unit 130 (image forming unit 213) into n (n is a natural number) sections in the main-scanning direction. This laser distortion information is stored in a ROM (not illustrated) included in the printer unit 130. The main-scanning direction maximum output range represents the maximum output range in the main-scanning direction of the image that can be output by the printer unit 130 (image forming unit 213).

The first distortion information notification unit 212 notifies the image processing unit 118 (first distortion information obtaining unit 201) of the first distortion information stored in the first distortion information storage unit 211 via the device I/F 117. In the present exemplary embodiment, unless otherwise stated, the word "notify" can also be read as "transmit".

The image forming unit 213 forms an image on a sheet-like recording medium such as a paper sheet based on the distortion-corrected image data output from the image processing unit 118 (image output unit 208) via the device I/F 117.

Outline of Distortion Types and Distortion Correction

FIGS. 3A to 3F are diagrams that illustrate the concept of the distortion correction processing performed by the image correction unit 207 using the output image from the respective modules. Each of FIGS. 3A to 3F illustrate, in order from the left, an image developed in the memory 116, an image after distortion correction by the image correction unit 207, and an image output by the image forming unit 213. FIGS. 3A, 3C, and 3E illustrate images in a case where image distortion correction is not performed by the image correction unit 207 (in a case of a through setting), and FIGS. 3B, 3D, and 3F illustrate images when image distortion correction is performed by the image correction unit 207. Further, an area 301 indicated by the vertical line pattern in the figures represents an invalid image (white pixel group) applied on the image data to perform distortion correction. Similarly, an area 302 represents an image formed from the area 301. In other words, the image that is finally output from the printer unit 130 (image forming unit 213) is a distorted image that includes the area 302. However, since the image formed by the area 302 cannot be perceived as it is not actually formed on the recording medium, an apparently straight image is obtained. The method for applying the invalid image will be described below with reference to FIG. 4.

FIGS. 3A and 3B illustrate correction of distortion in the sub-scanning direction caused by bending of the laser scanning line. In FIGS. 3A and 3B, it may be assumed that there is no distortion (geometric distortion) in the sub-scanning direction produced by physical factors, such as assembly error of the transfer belt, which is an endless belt. To correct sub-scanning image distortion caused by laser bending like that illustrated in FIG. 3A, an apparently straight output image can be obtained by correcting image data in the sub-scanning direction, which is the opposite direction to the laser bending, and applying the invalid area 301, as illustrated in FIG. 3B.

FIGS. 3C and 3D illustrate correction of a distorted image that is skewed in the sub-scanning direction due to physical factors, such as assembly error of the transfer belt, by correcting the image data. In FIGS. 3C and 3D, it may be assumed that there is no distortion (laser distortion) in the sub-scanning direction caused by laser bending. Specifically, as illustrated in FIG. 3D, an apparently straight output image can be obtained by performing distortion correction based on information about the skew (geometric distortion) of the image, as illustrated in FIG. 3D, on an image that is formed distorted in the sub-scanning direction like as illustrated in FIG. 3C.

FIGS. 3E and 3F illustrate distortion correction including the two types of distortion (laser distortion and geometric distortion) illustrated in FIGS. 3A and 3C. FIG. 3E illustrates an image that includes both the types of distortion illustrated in FIGS. 3A and 3C. FIG. 3F illustrates an output image when distortion correction is performed while considering both types of distortion (laser distortion and geometric distortion) illustrated in FIGS. 3A and 3C.

Distortion Correction Processing Method

An example of image correction processing performed by the image correction unit 207 illustrated in FIG. 2A will now be described with reference to FIGS. 4A to 4H. In the following, as an example, the distortion correction is realized by shifting a read memory scanning position in the sub-scanning direction when reading image data from the memory.

A memory image 400 illustrated in FIG. 4A schematically illustrates image data developed in the memory 116 with an address 0x10000000 as the initial position. The X direction and the Y direction illustrated in FIG. 4A are the main scanning direction and the sub-scanning direction, respectively. The image correction unit 207 scans the memory image 400, reads the pixels at the scanning position, and transmits the read pixels to the image output unit 208. When scanning the memory image 400, the image correction unit 207 corrects the image by switching the scanning line (scanning position in the sub-scanning direction) of the memory image 400 at a position in the main scanning direction determined based on the distortion correction setting value. This correction method will now be described below.

FIG. 4B schematically illustrates an example of a memory scanning setting of the image correction unit 207. The image correction unit 207 sets a scanning start address and a scanning direction before memory scanning starts. The scanning start address is information representing at which position in the memory area to start the scanning. The scanning direction is information representing whether to scan in the direction in which the address gets larger (+ direction), or the direction in which the address gets smaller (− direction).

In the example illustrated in FIG. 4B, the scanning start address "0x10000000" and scanning direction "+" are set. When scanning is started with this setting, the image correction unit 207 performs straight line scanning in the +direction from the scanning start address 0x10000000. A segment 401 indicated by a rectangular shape in FIG. 4B is an access unit by the image correction unit 207. The access unit in the X direction may be one pixel, or a plurality of pixels. In the present exemplary embodiment, the access unit is 64 pixels. Further, the access unit in the Y direction is one line. The numbers marking each segment in the drawing denote the access order by the image correction unit 207. Specifically, the memory scanning setting is a setting in which the same line is accessed in a straight line in the + direction from the segment on the left end in order of segments 2 and 3. The memory image 400 is an image formed from five lines in the Y direction, which includes one straight line that is parallel to the X direction. With respect to the memory image 400, the image correction unit 207 scans each line in a straight direction based on the setting illustrated in FIG. 4B, and outputs the scanned data to the printer unit 130 via the image output unit 208.

If there is no laser scanning bending or geometric distortion, such as transfer belt skew in the memory scanning setting illustrated in FIG. 4B, a straight line 411 like that illustrated in FIG. 4C is output on a recording paper 410. However, if there is laser scanning bending or geometric distortion in the memory scanning setting illustrated in FIG. 4B, a curve 412 like that illustrated in FIG. 4D is output.

A distortion correction processing method will now be described which generates an image that cancels out the distortion of the curve 412 so as to correct distortion like that of the curve 412 to ultimately obtain an output like the straight line 411.

FIG. 4E illustrates an example in which the memory scanning setting of the image correction unit 207 illustrated in FIG. 4B has been changed. The difference between the memory scanning setting of FIG. 4E and the memory scanning setting of FIG. 4B is whether the position in the main scanning direction (line shifting point) for switching the scanning line of the memory scanning has been set in the memory scanning setting. For example, the line shifting point in FIG. 4E is such that the memory scanning of the image correction unit 207 is shifted one line in a + or − Y direction at position segments 2 and 4 that are determined based on the distortion correction setting value, so that scanning is performed following the curve 412 that is superimposed in FIG. 4E. Namely, memory scanning starts from segment 421 at the initial position, and the sub-scanning position of the segment to be scanned is shifted one line at the position of segment 422 and segment 423. Thus, the shifting by one line of the sub-scanning position at a predetermined segment is referred to as a "line shifting", and the position in the main scanning direction at which the line shifting is performed like segment 422 and segment 423 is referred to as a "line shifting point". Further, such processing for performing a line shifting is referred to as "line shifting processing". The method for calculating the distortion correction setting value, which is a memory scanning setting value for performing line shifting processing like that in FIG. 4 E, will be described below with reference to FIG. 8.

FIG. 4F schematically illustrates the scanning position when memory scanning is performed on the memory image 400 based on the memory scanning setting of the image correction unit 207 illustrated in FIG. 4E. As illustrated in FIG. 4F, when scanning in order from segment 1, memory scanning may be performed over segments where no image data of the memory image 400 presents, as illustrated by the second segment 431. During the memory scanning of this segment, an arbitrary data value can be set. In the present example, data representing a blank is transmitted. The segments hatched with the slanted lines in the drawings similarly to segment 431 indicate segments for which data representing a blank is transmitted. The data representing a blank that is transmitted is the invalid image 301 illustrated in FIG. 3.

FIG. 4G schematically illustrates image data transmitted to the image output unit 208 as a result of the memory scanning performed by the image correction unit 207 based on the setting in FIG. 4E. In FIG. 4G, the image data has been modified in the reverse direction to the distortion direction illustrated in FIG. 4D.

FIG. 4H schematically illustrates an image printed by the printer unit 130 based on the image data illustrated in FIG. 4G. As illustrated in FIG. 4G, a desired straight line is rendered as a result of the image data corrected by curving in the reverse direction to cancel out laser distortion and geometric distortion.

Distortion Correction Processing Flow

Figure 5A:
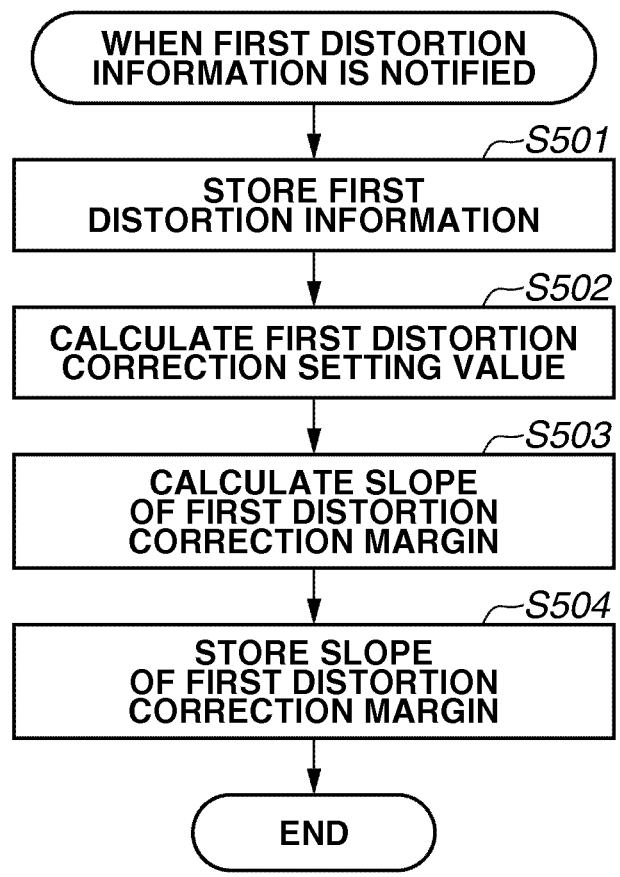
FIGS. 5A, 5B, and 5C illustrate an example of a distortion correction processing flow in an image processing unit 118.
Figure 5B:
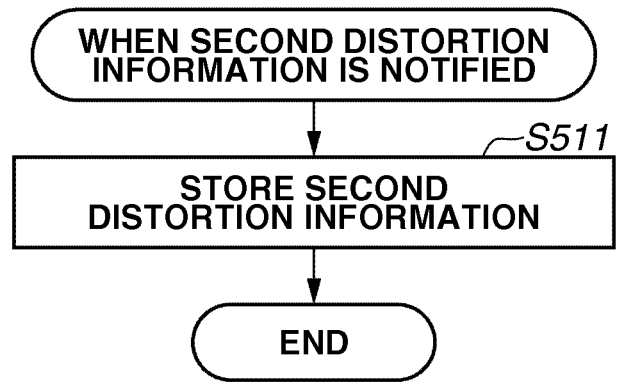
Figure 5C:
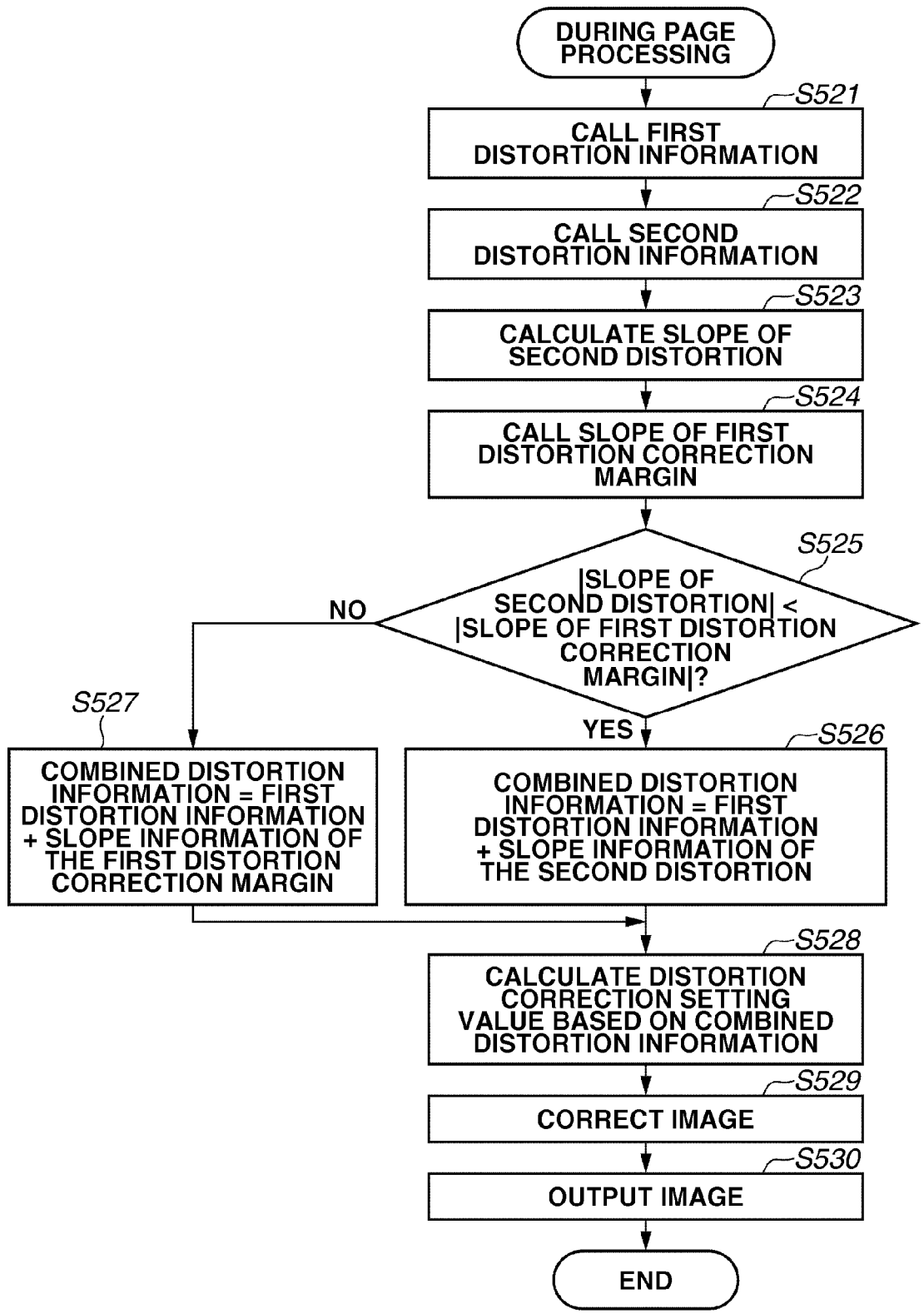

FIGS. 5A to 5C are examples of flows that illustrate a distortion correction processing in the image processing unit 118. The processing relating to distortion correction performed by the image processing unit 118 is performed in the three stages illustrated in FIGS. 5A to 5C. The processing timing performed in each of FIGS. 5A to 5C is independent and there is no dependence relationship.

FIG. 5A illustrates the flow performed when first distortion information is transmitted from the first distortion information notification unit 212 of the printer unit 130 via the device I/F 117. This is processing that is performed at a timing after calibration mode has ended.

In step S501, the first distortion information storage unit 202 stores the first distortion information (laser distortion information) transmitted from the first distortion information notification unit 212 in the first distortion information storage unit 202.

Next, in step S502, the distortion correction setting value calculation unit 206 calculates a first distortion correction setting value based on the first distortion information obtained in step S501. The first distortion correction setting value will be described below with reference to FIG. 6B.

In step S503, the distortion correction setting value calculation unit 206 calculates slope of a first distortion correction margin based on the first distortion correction setting value calculated in step S502 and a predetermined correction upper limit. The slope of the first distortion correction margin will be described below with reference to FIG. 6B.

In step S504, the distortion correction setting value calculation unit 206 stores the slope of the first distortion correction margin in the first distortion correction margin storage unit 205.

FIG. 5B illustrates the flow performed when second distortion information is set from the operation unit 140. This processing is executed at timing when the setting mode is instructed as the operation mode of the MFP 100.

In step S511, the second distortion information obtaining unit 203 obtains set second distortion information (geometric distortion information), stores the obtained second distortion information in the second distortion information storage unit 204, and ends the processing. The setting of the second distortion information will be described below with reference to 7.

FIG. 5C illustrates the flow performed during page processing. This processing is executed at timing when the printing processing of the image has started.

In step S521, the distortion correction setting value calculation unit 206 calls from the first distortion information storage unit 202 the first distortion information about each process color. Further, in step S522, the distortion correction setting value calculation unit 206 calls from the second distortion information storage unit 204 the second distortion information.

Next, in step S523, the distortion correction setting value calculation unit 206 calculates the slope of the second distortion from the called second distortion information. The slope of the second distortion will be described below with reference to FIG. 8.

In step S524, the distortion correction setting value calculation unit 206 obtains the slope of the first distortion correction margin for each process color stored in the first distortion correction margin storage unit 205 in step S504.

In step S525, the distortion correction setting value calculation unit 206 compares the absolute value of the slope of the second distortion with the absolute value of the slope the first distortion correction margin. This processing will be described with reference to FIG. 6. Namely, the distortion correction setting value calculation unit 206 functions as a means for comparing the absolute value of the slope of the second distortion, which is a displacement amount determined based on geometric distortion information, and the slope of the first distortion correction margin, which is a threshold.

Next, the distortion correction setting value calculation unit 206 calculates combined distortion information about each process color.

Specifically, if it is determined in step S525 that the absolute value of the slope of the second distortion is less than the absolute value of the slope of the first distortion correction margin (YES in step S525), the processing proceeds to step S526. In step S526, the distortion correction setting value calculation unit 206 calculates combined distortion information for each process color by adding, for each section, the displacement amount of the image in the sub-scanning direction of the first distortion information of each process color and slope information of the second distortion, respectively. The slope information of the second distortion is the displacement amount of the image with respect to the sheet caused by geometric distortion in each section arrayed in the main-scanning direction similarly to the first distortion information. This slope information of the second distortion will be described below with reference to FIG. 8.

Further, if it is determined that the absolute value of the slope of the second distortion is equal to or greater than the absolute value of the slope of the first distortion correction margin (NO in step S525), the processing proceeds to step S527. In step S527, the distortion correction setting value calculation unit 206 calculates combined distortion information for each process color by adding, for each section, the displacement amount of the image in the sub-scanning direction of the first distortion information of each process color and the slope information of the first distortion correction margin, respectively. The slope information of the first distortion correction margin is the distortion correction margin in each section arrayed in the main-scanning direction similarly to the first distortion information. This slope information of the first distortion correction margin will be described below with reference to FIG. 6C.

In step S528, the distortion correction setting value calculation unit 206 calculates a distortion correction setting value for correcting laser distortion and geometric distortion based on the calculated combined distortion information for each process color in each section calculated in step S526 or S527. The processing for calculating the combined distortion information and the distortion correction setting value will be described below with reference to FIG. 8.

Then, in step S529, the image correction unit 207 performs distortion correction of the image of each process color by, having set memory scanning like as illustrated in FIG. 4E based on the calculated distortion correction setting value, memory scanning the memory image.

In step S530, the image output unit 208 outputs the image on which distortion correction has been performed to the printer unit 130.

Distortion Correction Margin

Figure 6A:
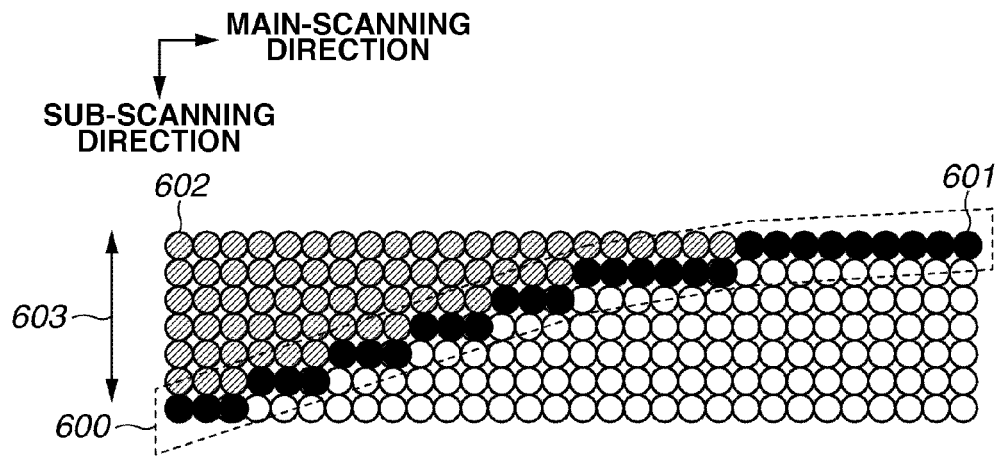
FIGS. 6A, 6B, and 6C illustrate distortion correction margin.
Figure 6B:
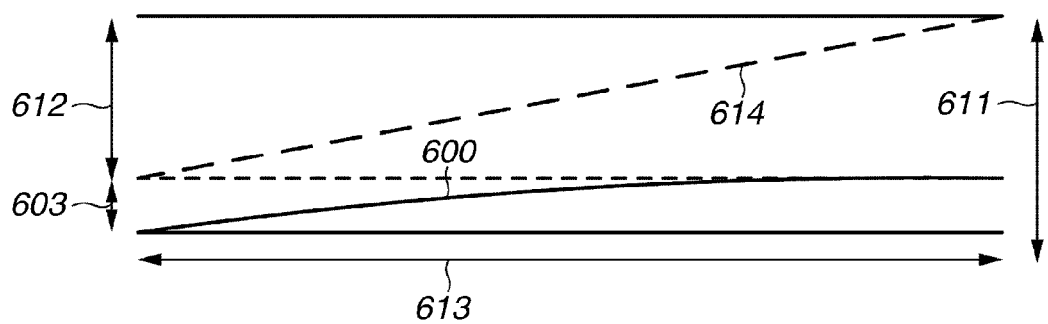
Figure 6C:
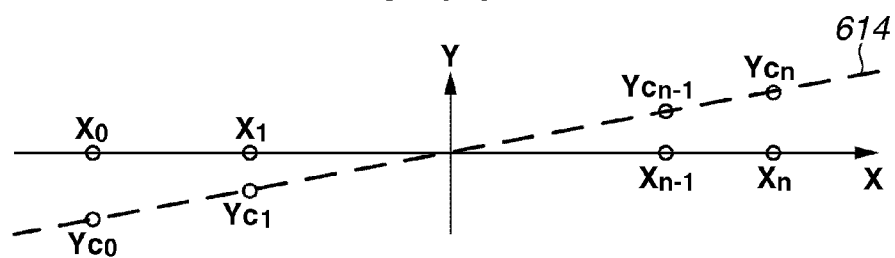

FIGS. 6A to 6C are diagrams illustrating the above-described margin of distortion correction. FIG. 6A schematically illustrates image data (corresponding to FIG. 3B) obtained by correcting one line of image data with the image correction unit 207 based on laser distortion information (first distortion information).

The black-colored pixels 601 are pixels in the image (memory image 400 in FIG. 4) developed in the memory 116. The pixels 602 hatched with slanted lines are invalid pixels added by the image correction unit 207. The area formed by the pixels 602 corresponds to the area 301 in FIG. 3 and the area of the hatched section in FIG. 4G. Further, the curve 600 represents a pixel group configured by the pixels 601, namely, is a curve on the image data after distortion correction.

FIG. 6A illustrates an example in which distortion correction based on the laser distortion information is performed on a straight line image data with one line width to cause corrected image data to become seven lines. In the example illustrated in FIG. 6A, distortion correction based on laser distortion information is illustrated for a case in which the main-scanning maximum output range of the printer unit 130 is divided into ten sections in units of three-pixels in the main-scanning direction. For example, at the left-most section, the image data indicating a straight line is shifted forward in the sub-scanning direction by six lines by memory scanning based on the laser distortion information, so that six lines worth of invalid pixels are added. If the section is similarly moved to the right, the image data is similarly shifted forward in the sub-scanning direction by a number of lines based on the laser distortion information representing the displacement amount of the laser scanning line in each section, and that number of lines worth of invalid pixels is added.

The number of lines of added invalid pixels is referred to as a distortion correction amount, indicated as range 603 in FIGS. 6A and 6B. Specifically, the distortion correction amount indicates the number of lines of invalid pixels to be added when performing distortion correction of the image based on the laser distortion information. Further, this distortion correction amount is also called a first distortion correction setting value.

Since the distortion correction performed by the image correction unit 207 ultimately depends on hardware, such as the memory size of the buffer, in order to perform the distortion correction, there is an upper limit to this distortion correction amount 603. For example, if the memory size is capable of storing six more lines worth in addition to the original image data, distortion correction can be performed based on a distortion correction amount 603 of up to a maximum of six lines worth. Namely, the upper limit of the distortion correction amount 603 is six lines.

FIG. 6B illustrates the above-described distortion correction amount upper limit, the distortion correction amount, and the first distortion correction margin calculated therefrom.

A maximum correctable amount 611 (maximum number of lines that can be corrected) represents an upper limit of the distortion correction amount 603. Namely, distortion correction can be performed by adding invalid pixels 602 to the external side of the image data until the number of lines reaches the maximum correctable amount 611 for one line of image data. However, no more than that can be corrected.

For the curve 600 illustrated in FIG. 6B that has been distortion-corrected based on the laser distortion information, correction can be further performed until the number of lines indicated by the width 612. The size of the scope indicated by the width 612 indicates a value (number of lines) calculated by (maximum correctable amount 611—maximum value of the distortion correction amount 603). This value is called the first distortion correction margin. Namely, the first distortion correction margin is calculated based on the maximum correctable amount 611 and the distortion correction amount (first distortion correction setting value).

In the present exemplary embodiment, since distortion correction is performed by combining a plurality of pieces of distortion information, such as laser distortion information and geometric distortion information, there is need to ensure that the combined distortion information combining the plurality of pieces of distortion information does not exceed the maximum correctable amount 611. The obtained maximum correctable amount 611 may be stored in a maximum correctable amount storage unit (not illustrated) included in the image processing unit 118, or may be stored in an image processing program developed in the RAM 112 from the HDD 115.

Further, in the present exemplary embodiment, the distortion correction setting value calculation unit 206 calculates the first distortion correction margin 612 based on the first distortion correction setting value. In addition, the distortion correction setting value calculation unit 206 calculates slope of the first distortion correction margin based on the first distortion correction margin 612 (step S503 in FIG. 5A). The slope of the first distortion correction margin is the slope of a linear function 614 determined from a main scanning maximum output range 613 and the first distortion correction margin 612. Specifically, slope of the first distortion correction margin=first distortion correction margin 612/main-scanning maximum output range 613.

In FIG. 6C, the linear function 614 is plotted in XY coordinates. From X0 to Xn in FIG. 6C, the main-scanning maximum output range 613 is divided into n sections (wherein n is a natural number), which represent the X coordinate of the main-scanning edge of each section. Yc0 to Ycn represent the Y coordinate of the linear function 614 for the X coordinate of the main-scanning edge of each section. The Y coordinate for each X coordinate is slope information of the first distortion correction margin. Since the slope information of the first distortion correction margin represents the correction amount of geometric distortion in each section, it is used to generate combined distortion correction information. This slope information of the first distortion correction margin is for a case when the slope of the second distortion indicates a positive slope. If the slope of the second distortion indicates a negative slope, the slope information of the first distortion correction margin is a value obtained by multiplying the slope information of the determined first distortion correction margin by −1.

The slope of the linear function 614a (slope of first distortion correction margin) represents an upper limit for geometric distortion correction, which will be described below with reference to FIG. 7. Namely, if the slope of the absolute value of the geometric distortion (slope of second distortion) does not exceed the absolute value of the slope of the first distortion correction margin, the geometric distortion is corrected based on the geometric distortion information (second distortion information).

The reason for comparing the absolute values of both the slope of the second distortion and the slope of the first distortion correction margin in step S525 of FIG. 5 is because, depending on the geometric distortion information (second distortion information), the correction amount based on the combined distortion information (refer to FIG. 8) may exceed the maximum correctable amount 611. If the correction amount based on the combined distortion information exceeds the maximum correctable amount 611, the distortion correction setting is set within the correctable range.

Further, the reason for comparing the respective absolute values at this stage is also to simplify the comparison logic. Although in principle the distortion correction margin can have a different range for the positive slope and the negative slope, in this case, the logic becomes complex. Since step S525 is processing that is performed during print processing in print mode, if the logic is complex, performance may deteriorate. Therefore, absolute values are used in order to simplify the logic.

Setting of Geometric Distortion Information

FIGS. 7A to 7D are diagrams that illustrate a procedure when setting geometric distortion information (second distortion information). Based on this geometric distortion information, slope of the second distortion is calculated. The setting of the geometric distortion information is performed by the user issuing an instruction to the control unit 110 via the operation unit 140 for a geometric distortion information setting mode operation. The setting mode will now be described with reference to FIG. 7.

In the setting mode of the image processing apparatus according to the present exemplary embodiment, first, the control unit 110, based on the user instruction (refer to FIG. 7C), prints on a sheet, which is a recording medium, a specific pattern (refer to FIG. 7A). Next, the user measures the length of the specific pattern (refer to FIG. 7B) on the sheet at predetermined locations, and inputs (refer to FIG. 7D) information (m0, m1, m2) about each measured length into the operation unit 140. Then, the control unit 110 receives the information about each length via the operation unit 140, and obtains the information about these lengths as geometric distortion information (second distortion information). The control unit 110 then stores the obtained geometric distortion information. This obtained geometric distortion information is commonly used in the distortion correction of the image data for a plurality of process colors in print mode. In the present exemplary embodiment, the geometric distortion information is commonly used for the distortion correction of the image data for all the process colors. This geometric distortion information will be, as described below, described using linear distortion as an example that can be represented by a linear function.

FIG. 7A illustrates an example of an image (image data) having a specific pattern that is output. The image data of this specific pattern is pre-stored in the memory 116. Further, this specific image pattern may be formed from monochromatic color among the process colors, or as a mixed color of a plurality of the process colors. If color shift occurs in a case where the specific image pattern is formed by the mixed color of a plurality of the process colors, the MFP 100 may be configured so that calibration mode is forcibly executed based on a user instruction.

FIG. 7B illustrates an example of a specific pattern printed on a paper sheet. The printed specific pattern illustrated in FIG. 7B is an image obtained by printing onto a paper sheet an image in which the specific pattern illustrated in FIG. 7A has been subjected to distortion correction based on laser distortion information. Namely, in the setting mode, the control unit 110 performs distortion correction on an image of the specific pattern based on laser distortion information according to the method illustrated in FIG. 4.

FIG. 7C illustrates an example of a screen displayed on the operation unit 140 when printing a specific pattern. The user issues a selection instruction for the feeding cassette in which A3 size paper is stored by operating the display screen of FIG. 7C, and presses the pattern output button. Consequently, the control unit 110 prints the specific pattern. Although in this example a feeding cassette storing A3 size paper is described as the feeding cassette for which a selection instruction should be issued, a feeding cassette storing some other size of paper may also be selected.

FIG. 7D illustrates an example of a screen displayed on the operation unit 140 when setting the geometric distortion information (second distortion information). The user measures the lengths at locations corresponding to the m0, m1, and m2 illustrated in FIG. 7D in the printed specific pattern, and inputs the measured lengths into the operation unit 140. As described above, these input values (length information) are commonly used in the distortion correction of the image data of a plurality of process colors. Further, as illustrated in step S511 of FIG. 5B, this length information is stored in the second distortion information storage unit 204 as second distortion information. Although in FIG. 7D, m0 is displayed as being longer than m1, in the actual output m0 is not always greater than m1 as illustrated in FIG. 7B. In the example illustrated in FIG. 7D, the slope of the second distortion is represented by (m0−m1)/m2.

The processing described above is processing performed when setting the geometric distortion information (second distortion information) in the control unit 110.

Calculation of Combined Distortion Information

FIGS. 8A to 8D are diagrams that illustrate the processing for calculating the combined distortion information (steps S526 and S527), and processing for calculating the distortion correction setting value (step S528). This calculation processing for the combined distortion information and the distortion correction setting value is performed for each process color.

Figure 8A:
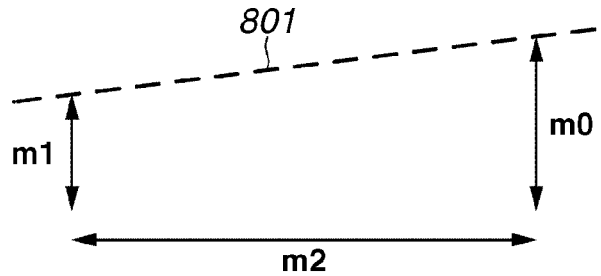
FIGS. 8A, 8B, 8C, and 8D illustrate processing for combining a first and a second distortion.
Figure 8B:
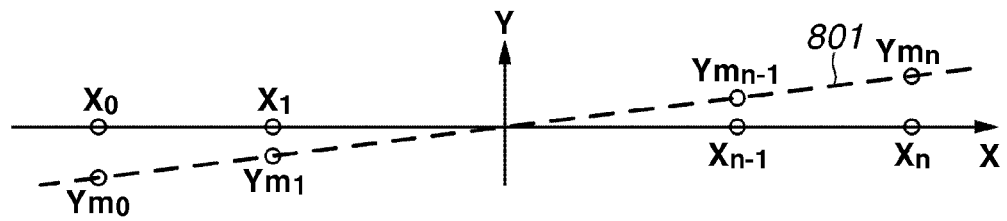

FIGS. 8A and 8B illustrate processing for calculating a linear function 801 that represents the slope of the second distortion based on the geometric distortion information (second distortion information) illustrated in FIG. 7D.

In FIG. 8A, the distortion correction setting value calculation unit 206 of FIG. 2A calls m0, m1, and m2, which are second distortion information stored in the second distortion information storage unit 204, and determines the slope of the second distortion based on (m0−m1)/m2 (step S523 in FIG. 5C).

FIG. 8B is a diagram in which a linear function 801 having this slope of the second distortion is plotted in XY coordinates. The X axis in FIG. 8B represents the main-scanning direction, and the Y axis represents the sub-scanning direction. Coordinates X0 to Xn in FIG. 8B match the respective X coordinates in the main scanning direction illustrated in FIG. 6C. Ym0 to Ymn are the Y coordinates of the linear function 801 for the respective X coordinates (X0 to Xn). Ym0 to Ymn are slope information of the second distortion determined based on the second distortion information. Namely, the slope information of the second distortion is information that represents the displacement amount of geometric distortion caused by skew of, for example, the transfer belt or the sheet-like recording medium, at each X coordinate point.

Figure 8C:
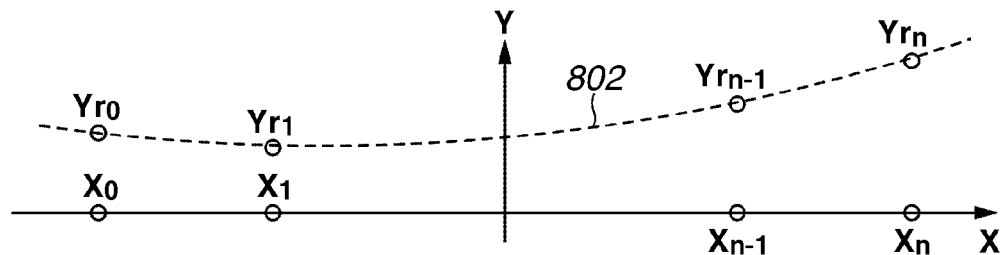

FIG. 8C is a diagram in which first distortion information (Yr0 to Yrn) is plotted in XY coordinates. An approximation curve 802 is a distortion curve calculated from the first distortion information, which approximates the actual laser scanning locus with respect to the ideal main-scanning line. The first distortion information is information that represents the displacement amount in the sub-scanning direction of the laser scanning line from the ideal scanning line at each X coordinate point. Further, the above-described first distortion correction setting value is the amount that a pixel is moved in the sub-scanning direction for each section arrayed in the main-scanning direction for correcting this displacement amount.

Figure 8D:
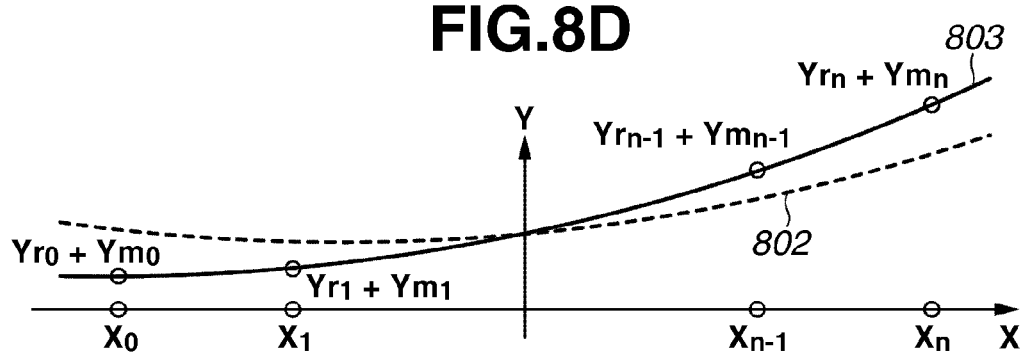

FIG. 8D is a diagram in which combined distortion information that combines the first distortion information (Yr0 to Yrn) and the second distortion slope information (Ym0 to Ymn) is plotted in XY coordinates (step S526). The combined distortion information is the addition product (e.g., Yr0+Ym0) of adding the respective Y coordinates of the first distortion information and the slope information of the second distortion for the X coordinates of each section from X0 to Xn. Curve 803 is an approximation curve representing distortion, including laser scanning distortion and transfer belt distortion, for example, calculated from the combined distortion information. Namely, the combined distortion information is information representing the sum of the displacement amount caused by laser distortion and the displacement amount caused by geometric distortion at each X coordinate point.

Further, although not illustrated, the processing performed in step S527 is, similar to the combination of the first distortion information and second distortion information illustrated in FIG. 8D, processing that adds the first distortion information (Yr0 to Yrn) and the slope information of the first distortion correction margin (Yc0 to Ycn). During this processing, the distortion correction setting value calculation unit 206 refers to the symbol of the slope of the second distortion, and if the slope of the second distortion symbol is negative, adds the value obtained by multiplying the slope information of the first distortion correction margin by "−1" to the first distortion information.

The distortion correction setting value calculation unit 206 calculates the combined distortion information, and calculates the distortion correction setting value based on this combined distortion information.

Calculation of the distortion correction setting value (step S528) will now be described. As described above, the combined distortion information is information representing the sum of the displacement amount caused by laser distortion and the displacement amount caused by geometric distortion at each X coordinate point. Namely, similar to the description made with reference to FIG. 6A, the distortion correction setting value for correcting the displacement amount caused by this plurality of types of distortion is set so as to cancel out the displacement amount represented by the combined distortion information. Specifically, the set distortion correction setting value is the movement amount in the sub-scanning direction of the image data of a section between the respective X coordinate points, which cancels out the displacement amount represented by the combined distortion information. It is indicated that, for example, if the displacement amount represented by the combined distortion information at a predetermined X coordinate is 8.2 pixels in the forward direction, the distortion correction setting value at that X coordinate moves the image data by eight pixels in the reverse direction in the sub-scanning direction.

The image correction unit 207 performs correction of the image by, having performed a memory scanning setting like that illustrated in FIG. 4E based on the distortion correction setting value, scanning the memory (step S529).

Figure 11B:
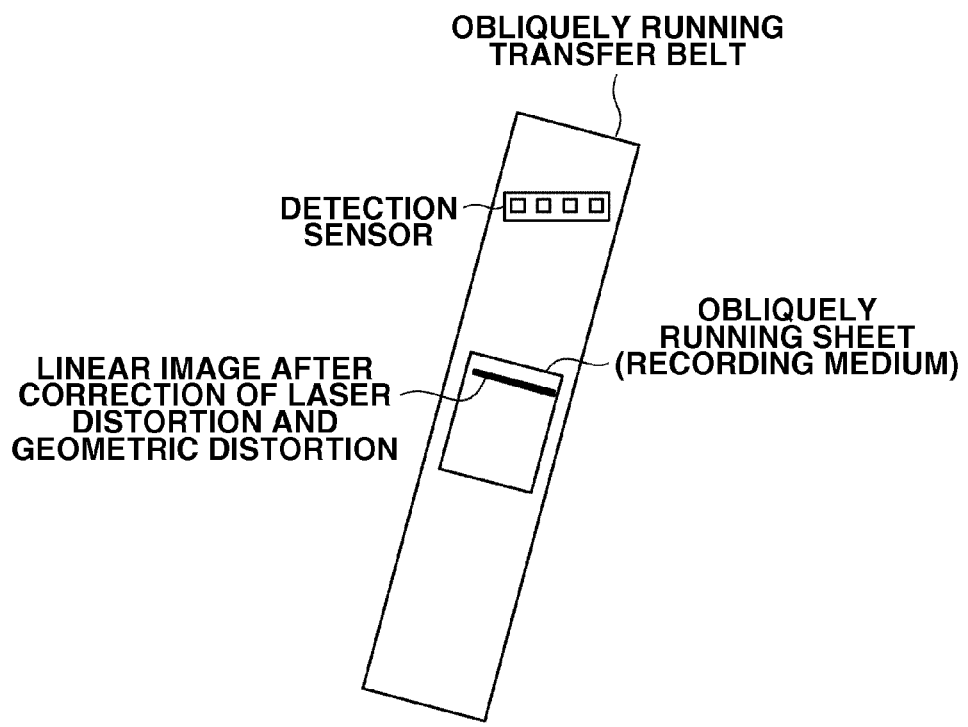

Thus, by performing distortion correction on the image data for each process color based on a distortion correction setting value that is based on combined distortion information, as illustrated in FIG. 11B, an image that is free from distortion with respect to a skewed sheet can be printed for each process color. This is because distortion caused by laser distortion of each process color and distortion caused by geometric distortion that is common to a plurality of process colors can be corrected. Further, in the above-described setting mode, since length information input by the user is commonly used in distortion correction of image data of each process color, the inconvenience of the user having to input length information for each process color is reduced.

According to the present exemplary embodiment, since distortion correction is performed in which consideration is given to distortion of the laser scanning line and geometric distortion caused by assembly error of parts, such as the transfer belt, an image printed on a sheet-like recording medium can be restrained from being distorted with respect to the sheet.

A second exemplary embodiment will now be described.

As the second exemplary embodiment, the processing performed when the host computer 170 is used as an image processing apparatus for performing distortion correction will be described with reference to FIGS. 9A and 9B. In the present exemplary embodiment, the MFP 100 functions as a printing means that is external to the host computer.

Figure 9A:
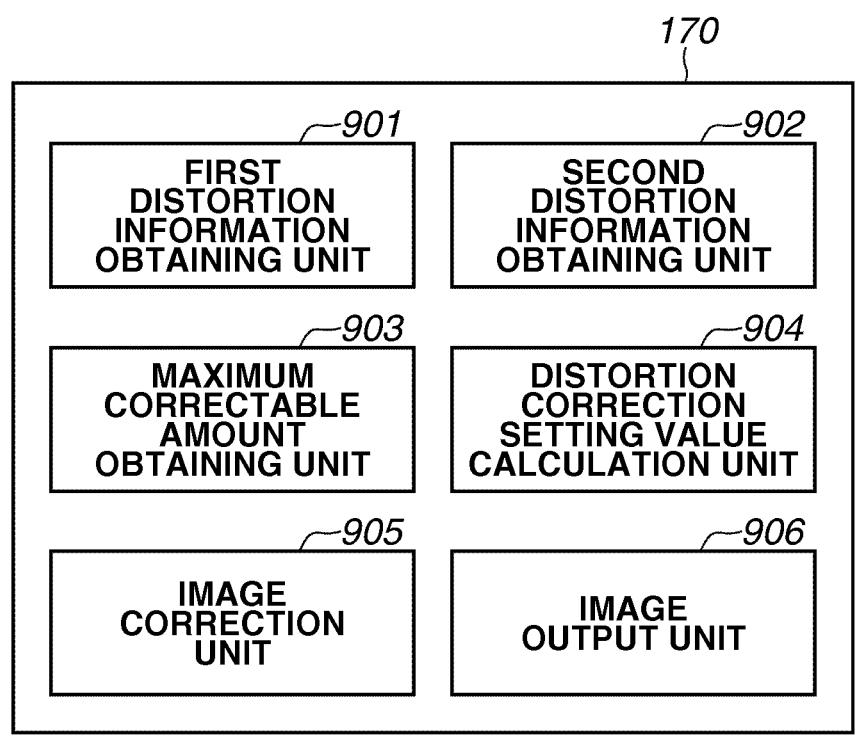

FIG. 9A schematically illustrates a configuration of the respective processing units included in the host computer 170, which is connected to the MFP 100 via the LAN 160. The host computer 170 includes the respective processing units illustrated in FIG. 9A. Further, the host computer 170 includes a HDD (not illustrated), in which a program for executing the processing flow of FIG. 9B is stored. The host computer 170 realizes the respective processing units illustrated in FIG. 9A by a CPU (not illustrated) loading this program into a ROM (not illustrated) and executing the program. Since the configuration of the MFP 100 according to the present exemplary embodiment is similar to the configuration of the MFP 100 described in the first exemplary embodiment, a description thereof is omitted here. Further, the respective processing units realized by the host computer 170 illustrated in FIG. 9A performs a part of the processing performed by the image processing unit 118 in the first exemplary embodiment.

The respective processing units illustrated in FIG. 9A will now be described.

A first distortion information obtaining unit 901, similar to the first distortion information obtaining unit 201 in FIG. 2A, obtains laser distortion information (first distortion information) from the printer unit 130 of the MFP 100.

The second distortion information obtaining unit 902, similar to the second distortion information obtaining unit 203 in FIG. 2A, obtaining geometric distortion information (second distortion information) stored in the HDD 115 or the RAM 112.

A maximum correctable amount obtaining unit 903 obtains a maximum correctable amount from the image processing unit 118. This maximum correctable amount obtaining unit 903 may also store a maximum correctable amount described in advance in a program code by the CPU of the host computer 170 executing a program.

A distortion correction setting value calculation unit 904, similar to the distortion correction setting value calculation unit 206 in FIG. 2A, calculates combined distortion information and a distortion correction setting value.

An image correction unit 905, similar to the image correction unit 207 in FIG. 2A, performs distortion correction by performing memory scanning on the image data based on a distortion correction setting value.

An image output unit 906 transmits distortion-corrected image data to the printer unit 130 via a LAN (not illustrated) interface included in the host computer 170.

Next, the distortion correction performed by the host computer 170 will be described with reference to FIG. 9B.

FIG. 9B illustrates the processing that is executed in the distortion correction setting value calculation unit 904 during the processing of each page when image data for a print job, such as PDL data, is transmitted to the MFP 100 from the host computer 170. Unless stated otherwise, the terms maximum correctable amount, slope of first distortion correction margin, slope of second distortion and the like have the same meaning as in the first exemplary embodiment.

In steps S911 and S912, the distortion correction setting value calculation unit 904 obtains first distortion information and second distortion information from the first distortion information obtaining unit 901 and the second distortion information obtaining unit 902.

Similarly, in step S913, the maximum correctable amount is obtained from the maximum correctable amount obtaining unit 903. This obtaining maximum correctable amount may be stored in a maximum correctable amount storage unit (not illustrated) included in the MFP 100, or in a maximum correctable amount storage unit (not illustrated) included in the host computer 170.

Next, in step S914, the distortion correction setting value calculation unit 904 calculates a first distortion correction setting value from the obtained first distortion information, and calculates slope of a first distortion correction margin based on the calculated first distortion correction setting value and the obtained maximum correctable amount.

Further, in step S915, slope of a second distortion is calculated based on the obtained second distortion information.

Next, in step S916, the distortion correction setting value calculation unit 904 compares the absolute value of the calculated slope of the first distortion correction margin with the absolute value of the slope of the second distortion, and calculates combined distortion information based on the comparison result.

If it is determined that the absolute value of the slope of the calculated first distortion correction margin is greater than the absolute value of the slope of the second distortion (YES in step S916), the processing proceeds to step S917. In step S917, like in step S526, the distortion correction setting value calculation unit 904 calculates combined distortion information by adding the first distortion information and the slope information of the second distortion.

Further, if it is determined that the absolute value of the calculated slope of the first distortion correction margin is not greater than the slope of the absolute value of the second distortion (NO in step S916), the processing proceeds to step S918. In step S918, like in step S527, the distortion correction setting value calculation unit 904 calculates combined distortion information by adding the first distortion information and the slope information of the first distortion correction margin.

In step S919, like in step S528, the distortion correction setting value calculation unit 904 calculates a distortion correction setting value based on the calculated combined distortion information. Then, based on this distortion correction setting value, the host computer 170 corrects the image data with the image correction unit 905, and outputs the image data to the MFP 100 via a LAN I/F 907 with the image output unit 906.

The MFP 100, which has received the corrected image data from the image output unit 906, then performs printing of this corrected image data.

Thus, since distortion correction is performed on the host computer side that considers laser distortion and geometric distortion of the image, similar to the first exemplary embodiment, distortion of an image with respect to a sheet-like recording medium can be restrained even for a low-cost MFP that does not include a configuration for performing distortion correction processing.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, an image in which distortion of an image to be printed on a sheet has been corrected can be obtained by performing distortion correction that considers laser distortion and geometric distortion.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-134842 filed Jun. 14, 2012, which is hereby incorporated by reference herein in its entirety.

What is claimed is:

1. An image processing apparatus configured to transmit image data to a printing unit for printing an image on a sheet, the image processing apparatus comprising:
 a first obtaining unit configured to obtain information representing displacement of an image in a sub-scanning direction;
 a second obtaining unit configured to obtain information representing displacement of an image to be printed on a sheet in a sub-scanning direction with respect to the sheet;
 a correction unit configured to, based on a plurality of correction amounts determined from information obtained by the first obtaining unit and information obtained by the second obtaining unit, at each of a plurality of positions in a main-scanning direction, perform correction for shifting the image data in the sub-scanning direction; and
 a transmission unit configured to transmit the corrected image data to the printing unit.

2. The image processing apparatus according to claim 1, wherein the printing unit is configured to print an image of a plurality of process colors on a sheet,
 wherein the information obtained by the first obtaining unit is information about each process color representing displacement of the image in the sub-scanning direction for each process color,
 wherein the information obtained by the second obtaining unit is information common to the process colors, and
 wherein the correction unit is configured to, based on a plurality of correction amounts determined from information about a process color of a processing target among the information obtained by the first obtaining unit and the information common to the process colors obtained by the second obtaining unit, at each of a plurality of positions in a main-scanning direction, perform correction for shifting an image of the process color of the processing target in the sub-scanning direction for each process color.

3. The image processing apparatus according to claim 1, wherein the second obtaining unit is configured to obtain information representing displacement of an image to be printed on a sheet in a sub-scanning direction with respect to the sheet by accepting an input of a measured length from an edge of the sheet to a predetermined pattern image printed on the sheet.

4. The image processing apparatus according to claim 3, wherein the second obtaining unit is configured to receive the input of the length measured at a fewer number of positions in the main-scanning direction than a number of a plurality of positions in the main-scanning direction determined based on information obtained by the first obtaining unit and information obtained by the second obtaining unit.

5. The image processing apparatus according to claim 3, wherein the second obtaining unit is configured to receive the input of the length measured at two positions in the main-scanning direction.

6. The image processing apparatus according to claim 3, wherein the second obtaining unit is configured to receive the input of the measured length based on a user instruction.

7. The image processing apparatus according to claim 3, wherein the predetermined pattern printed on the sheet is an image printed by the printing unit of image data on which correction has been performed by the correction unit based on a plurality of correction amounts determined from information obtained by the first obtaining unit, at each of a plurality of positions in the main-scanning direction.

8. The image processing apparatus according to claim 1, wherein the first obtaining unit is configured to obtain the information by detecting a pattern image formed on a photosensitive drum or a transfer belt included in the printing unit.

9. The image processing apparatus according to claim 1, wherein the correction unit is configured to use, as the plurality of correction amounts at each of a plurality of positions in the main-scanning direction, an amount obtained by adding a plurality of amounts determined from information obtained by the first obtaining unit at each of a plurality of positions in the main-scanning direction and a plurality of amounts determined from information obtained by the second obtaining unit at each of a plurality of positions in the main-scanning direction.

10. The image processing apparatus according to claim 9, wherein the correction unit is configured to, in a case where a value determined based on the information obtained by the second obtaining unit is equal to or greater than a threshold, use as the plurality of correction amounts at each of a plurality of positions in the main-scanning direction, a value obtained by adding a plurality of amounts determined from information obtained by the first obtaining unit at each of a plurality of positions in the main-scanning direction and a plurality of amounts determined from the threshold at each of a plurality of positions in the main-scanning direction, and
 wherein, in a case where a value determined based on the information obtained by the second obtaining unit is less than the threshold, use as the plurality of correction amounts at each of a plurality of positions in the main-scanning direction, a value obtained by adding a plurality of amounts determined from information obtained by the first obtaining unit at each of a plurality of positions in the main-scanning direction and a plurality of amounts determined from information obtained by the second obtaining unit at each of a plurality of positions in the main-scanning direction.

11. The image processing apparatus according to claim 1, wherein the printing unit is an image forming apparatus external to the image processing apparatus.

12. The image processing apparatus according to claim 1, wherein the printing unit is a unit that is built in the image processing apparatus.

13. An image processing method for transmitting image data to a printing unit configured to print an image on a sheet, the method comprising:
 obtaining information representing displacement of an image in a sub-scanning direction;
 obtaining information representing displacement of an image to be printed on a sheet in a sub-scanning direction with respect to the sheet;
 performing correction for shifting image data in the sub-scanning direction on the basis of a plurality of correction amounts determined from the first obtained information and the second obtained information at each of a plurality of positions in a main-scanning direction; and
 transmitting the corrected image data to the printing unit.

14. A non-transitory computer readable storage medium storing a program which causes at least one micro processor to perform an image processing method for transmitting image data to a printing unit configured to print an image on a sheet, the method comprising:
 obtaining information representing displacement of an image in a sub-scanning direction;
 obtaining information representing displacement of an image to be printed on a sheet in a sub-scanning direction with respect to the sheet;

performing correction for shifting image data in the sub-scanning direction based on a plurality of correction amounts determined from the first obtained information and the second obtained information at each of a plurality of positions in a main-scanning direction; and transmitting the corrected image data to the printing unit.

15. An image processing apparatus configured to transmit image data to a printing unit for printing on a sheet by laser scanning of a plurality of process color, the image processing apparatus comprising:
- a first obtaining unit configured to obtain for each of process color a first distortion information for correcting image distortion unique to a process color;
- a second obtaining unit configured to obtain a second distortion information for correcting image distortion common to a plurality of process colors;
- a correction unit configured to, based on combined distortion information obtained by combining the first distortion information and second distortion information obtained by the first and second obtaining unit, perform distortion correction by shifting a position of a pixel in halftone processed image data in the sub-scanning direction; and
- a transmission unit configured to transmit distortion corrected image data by the correction unit for each process color to the printing unit.

* * * * *